United States Patent [19]

Shellhause

[11] Patent Number: 4,573,557
[45] Date of Patent: Mar. 4, 1986

[54] DRUM BRAKE

[75] Inventor: Ronald L. Shellhause, Vandalia, Ohio

[73] Assignee: General Motors Corporation, Detroit, Mich.

[21] Appl. No.: 756,442

[22] Filed: Jul. 18, 1985

Related U.S. Application Data

[62] Division of Ser. No. 539,273, Oct. 5, 1983, Pat. No. 4,546,862.

[51] Int. Cl.$^4$ .................. F16D 65/14; F16D 51/24
[52] U.S. Cl. .................................. 188/216; 188/331; 188/335; 188/340; 188/250 C; 192/75; 192/101
[58] Field of Search ............... 188/216, 325, 331, 335, 188/340, 250 A, 250 C; 192/75, 101

[56] References Cited

U.S. PATENT DOCUMENTS

| | | | |
|---|---|---|---|
| 1,915,857 | 6/1933 | Loughead | 188/250 D X |
| 2,197,452 | 4/1940 | Fussell, Jr. | 188/326 X |
| 2,322,121 | 6/1943 | Frank | 188/331 X |
| 2,559,363 | 7/1951 | Mace . | |

Primary Examiner—George E. A. Halvosa
Attorney, Agent, or Firm—D. D. McGraw

[57] ABSTRACT

A drum brake assembly with a center guide backing plate, channeled web brake shoe assemblies slidably received on the center guide braking plate. A wheel cylinder assembly mounted in a notch on the center guide braking plate and engaged by a first set of adjacent brake shoe ends. A brake adjuster mounted between a second set of adjacent brake shoe ends, and retractor springs attached to the shoe assemblies and holding the shoe assemblies, wheel cylinder and brake adjuster in position on the center guide backing plate. The brake shoes are made of two identical shoe halves symmetrically formed about an axis so that the shoes also provide integral push rod-like which cylinder and adjuster engaging end.

1 Claim, 5 Drawing Figures

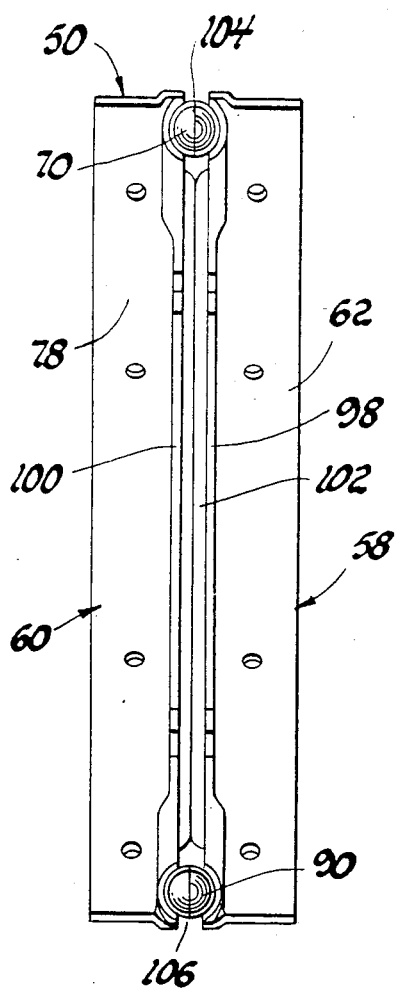
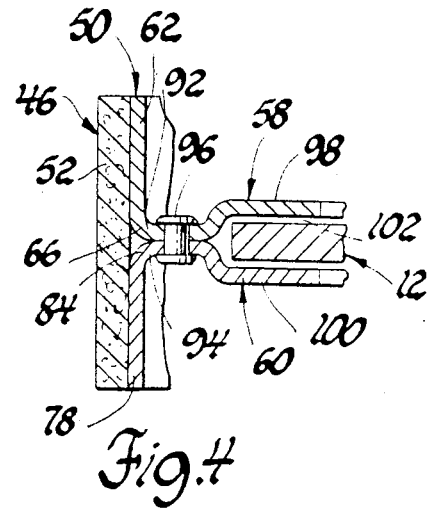
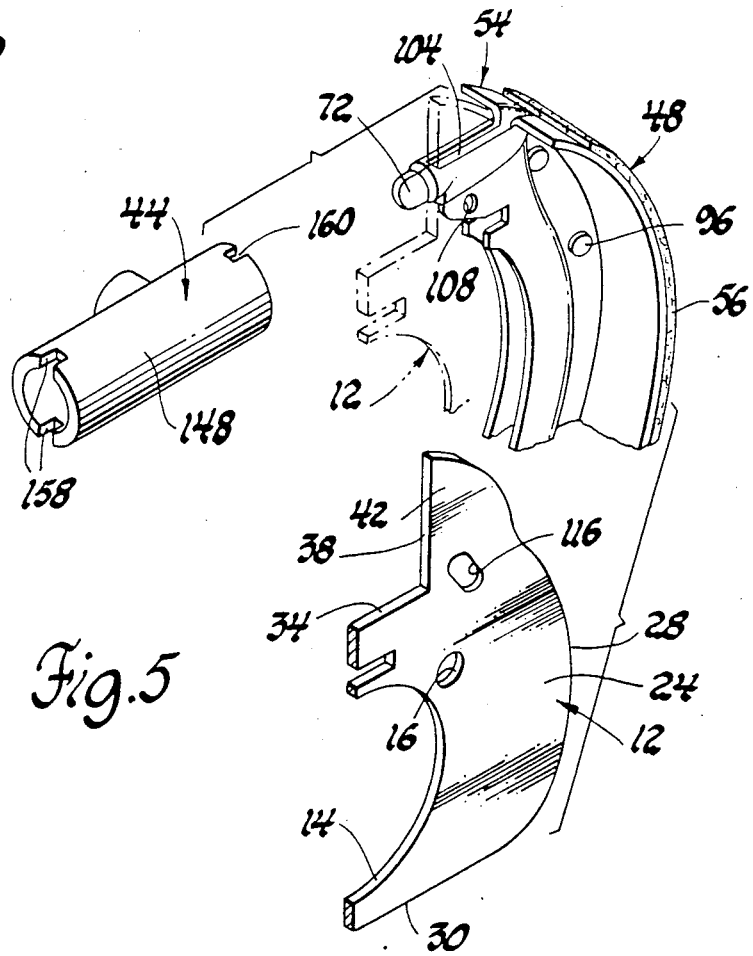

DRUM BRAKE

This is a division of U.S. patent application Ser. No. 539,273, filed Oct. 5, 1983, now U.S. Pat. No. 4,546,862, issued Oct. 15, 1985.

The invention relates to a drum brake for an automotive vehicle and more particularly to one in which an open backing plate provides a center guide mount for a pair of brake shoe assemblies which fit over the edge portions of the backing plate and require no additional mounting other than retraction springs. Each brake shoe assembly includes a lining segment and a shoe, the shoe being made in halves which are symmetrical about an axis. The shoe halves are secured together in matching relation to form a complete rim and web, with spherical ends which serve as push rods by engaging the wheel cylinder pistons and also engage and locate the brake adjuster. Upper and lower retraction springs hold the entire assembly together so that it may be transported as a unitary assembly and installed on the vehicle by attaching the backing plate to a flange fixed to a non-rotating part of the vehicle. The upper retractor spring is connected through sloped apertures in the backing plate to give a return registry for the shoe assemblies and hold them in engagement with the wheel cylinder assembly, thereby retaining the wheel cylinder assembly in position. The only fasteners required in the brake assembly are the mounting bolts holding the backing plate to its mounting sleeve, and shoe rivets if the lining segments are riveted to the shoes. The arrangement provides a cylinder anchor having a pivotal link function which permits the brake shoes to follow the drum surface. Brake shoe assemblies of the same size and capacity as those commonly used on passenger cars at this time weigh less than such current production brakes, provide improved cooling, and are readily adapted for automated manufacture and assembly. The arrangement may be of the duo-servo type as illustrated, or a leading/trailing type, or may use upper and lower wheel cylinders. It eliminates numerous parts used in current production drum brakes.

IN THE DRAWINGS

FIG. 3 is an elevation view of one of the brake shoe assemblies in the brake of FIG. 1, shown from the inner side before the line segment is attached thereto.

FIG. 4 is a fragmentary cross-section view of one of the brake shoe assemblies shown in the brake assembly of FIG. 1, taken in the direction of arrows 4—4 of that Figure.

FIG. 5 is an exploded perspective view of parts of the drum brake assembly illustrating portions of the backing plate, the wheel cylinder assembly and one brake shoe assembly, with parts broken away.

The drum brake assembly herein disclosed and claimed is also disclosed in patent application Ser. Nos. 539,107 and 539,272, also filed on Oct. 5, 1983 by the same inventor. The disclosures in these currently filed applications are therefore incorporated herein by reference.

This is an improvement on the drum brake disclosed and claimed in Applicant's U.S. Pat. No. 3,616,880, entitled, "Floating Anchor-Cylinder Drum Braker with Adjuster" and issued Nov. 2, 1971.

Figure 1:
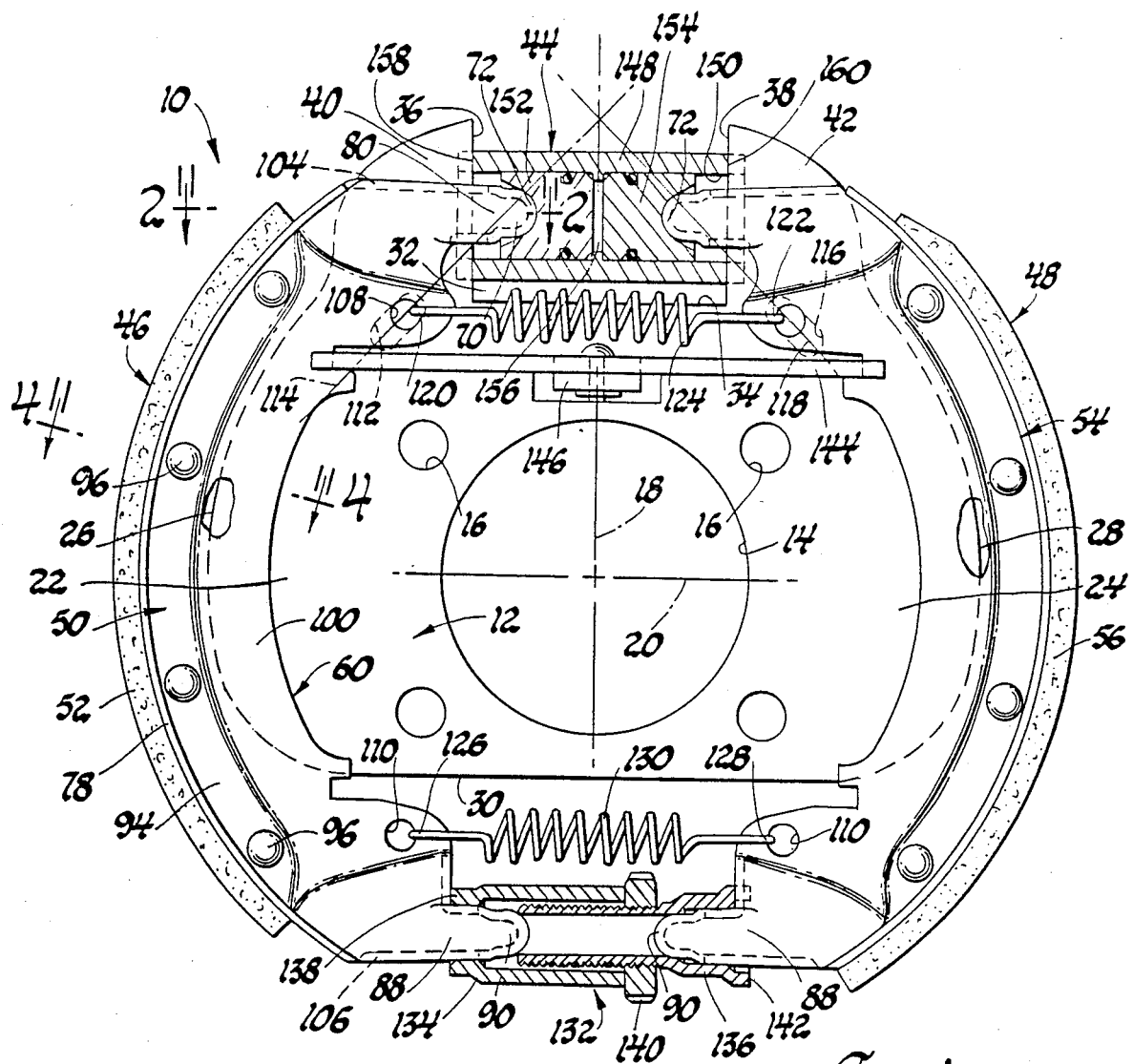
FIG. 1 is a elevation view of a drum brake assembly embodying the invention, with parts broken away and in section.

The drum brake assembly 10 has a backing plate 12 which also functions as a center guide for the brake shoe assemblies and the wheel cylinder assembly. The backing plate 12 has a center opening 14 through which a vehicle drive axle, not shown, may extend. It is also provided with several apertures 16, four such apertures being illustrated, through which mounting bolts are inserted to bolt the backing plate 12 to a fixed mounting flange, not shown. The mounting flange, as is well known in the art, may be secured to the outer end of a vehicle rear axle housing. If the brake is used on the front axle of a vehicle, the backing plate 12 is bolted to suitable portions of a steering knuckle and the stub axle extends through opening 14. The backing plate is symmetrically formed about the backing plate first diameter 18, which is the vertical diameter as seen in FIG. 1. A backing plate second diameter 20 is at right angles to diameter 18 and extends horizontally as seen in FIG. 1. The opposite portions of the backing plate through which diameter 20 extends provide arcuate backing plate sections 22 and 24 respectively having edge surfaces 26 and 28. The backing plate extends downwardly about diameter 18 slightly below the lower bolt apertures 16 and terminates in a chordal edge 30. The backing plate also extends upwardly along diameter 18, terminating in a notch 32 opening upwardly. The notch has a lower edge 34 which, like chordal edge 30, may be parallel to diameter 20, and side edges 36 and 38. The backing plate has arm-like extensions 40 and 42 respectively defining edges 36 and 38 and extending outwardly from the arcuate sections 22 and 24 to provide for mounting and guiding the wheel cylinder assembly 44, which is received within notch 32. Extensions 40 and 42 also extend through openings in the brake shoe assemblies to be described.

Brake shoe assemblies 46 and 48 are respectively received on the backing plate arcuate sections 22 and 24. The precise mounting arrangement will be described in detail below. Brake shoe assembly 46 includes a brake shoe 50 and a brake lining segment 52. Brake shoe assembly 48 includes an identical brake shoe 54 and a similar lining segment 56. The lining segments 52 and 56 may be identical if the same friction braking area is to be provided for as brake shoe assembly. However, it is usual to provide a brake lining segment having a smaller friction braking surface area on the primary shoe assembly and a larger friction braking surface area on the secondary shoe assembly. Thus, in the brake assemblies of FIG. 1, brake shoe assembly 46 is a primary brake shoe assembly of a duo-servo brake. If a leading/trailing arrangement is used, the lining segments 52 and 56 may have the same friction braking surface area. The same is true if wheel cylinders are used at opposite ends of the brake shoe assemblies.

Figure 2:
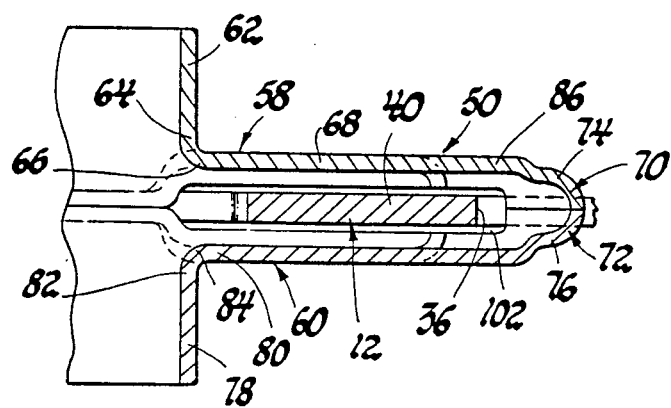
FIG. 2 is a fragmentary cross-section view of one end of one brake shoe assembly, taken in the direction of arrows 2—2 of FIG. 1 and having parts broken away.

As is better illustrated in FIGS. 2, 3 and 4, the brake shoe 50 of shoe assembly 46 is constructed in identical halves defined by shoe sections 58 and 60. The same is true of shoe 54, which is illustrated in the exploded perspective view of FIG. 5. While only brake shoe assembly 46 is described below in further detail, the same description applies to brake shoe assembly 48 and the same reference characters are used for identical parts hereinafter described.

Shoe section 58 has a rim portion 62 joined at the rim portion inner edge 64 to the radially outer edge 66 of shoe web section 68. The upper end 70 of shoe 50 has a spherical end 72 formed by semi-circumferential ball ends 74 and 76 respectively provided as parts of shoe sections 58 and 60. Shoe section 60 has a rim portion 78 and a web portion 80 similarly joined at their respective edges 82 and 84 in the same manner as the rim and web portion of shoe section 58. Web portions 68 and 80 have their upper ends extending from their rim portions in a direction which, in the installed position shown in FIG. 1, is substantially parallel to the backing plate diameter 20. The web portion upper ends terminate in the ball ends 74 and 76 and are in themselves semi-circumferentially formed. When the web portion upper ends are fitted together to form shoe 50, they define a generally round extension 86 which terminates at spherical end 72. The lower end of shoe 50 is identically formed so that the entire shoe 50 is substantially symmetrical about the backing plate diameter 20 when the shoe is installed as seen in FIG. 1. Thus the shoe lower end terminates in a generally round extension 88 having a spherical end 90.

The shoe web portions 68 and 80 have arcuately extending recess web parts 92 and 94 respectively positioned adjacent the web portion edges 66 and 84, as better seen in FIGS. 1, 4 and 5. When the shoe sections 58 and 60 are secured together to form shoe 50, the facing surfaces of web parts 92 and 94 are in engagement and suitably fastening means 96 are provided to hold the shoe sections together. As illustrated in the drawings, fastening means 96 are a series of rivets extending through matched openings formed in the webbed parts 92 and 94. Other fastening arrangements may be used. For example, application Ser. No. 539,107 noted above, discloses the use of rivets or spot welds for this purpose.

The inner parts 98 and 100 of web portions 68 and 80, respectively, are spaced apart to define a channel 102 which takes the form of an arcuate slot along the inner peripheral arc section of the shoe 50. The outer side of the web generally round extensions 86 and 88 have some material omitted so that slots 104 and 106 are provided as upper and lower extensions of channel 102. The upper slot 104 receives the arm-like extension 40 of backing plate 12 therethrough, as is illustrated in FIG. 1 in the assembled position and in FIG. 5 by phantom lines showing the final position of the backing plate extension 42 in relation to shoe 54. The web inner parts are provided with aligned openings 108 at the upper end of shoe 50 and aligned openings 110 at the lower end of that shoe. When assembled, as seen in FIG. 1, openings 108 are in alignment with oblong opening 112 formed in backing plate 12. The oblong opening 112 is a suitably contoured sloped slot having its major axis 114 extending at an acute angle to the backing plate first diameter 18 so that, as extended, it intersects that diameter near the upper side of wheel cylinder assembly 44. A similar oblong opening 116 with its major axis 118 is provided in the portion of the backing plate containing the arcuate backing plate section 22 and arm-like extension 42. When assembled, the ends 120 and 122 of the upper retraction spring 124 extend through the openings 108 and oblong openings 112 and 116 so that they are attached to the shoes 50 and 54 and urge the shoe upper ends toward each other. The oblong openings 112 and 116 act as cam guides to give a return registry for the brake shoe assemblies 46 and 48. The ends 126 and 128 of the lower retraction spring 130 extend through the lower aligned openings 110 of each shoe 50 and 54 so that spring 130 continually urges the lower ends 90 of shoe assemblies 46 and 48 toward each other. A brake adjuster assembly 132 is received on the lower ends 90 of shoes 50 and 54. The adjuster assembly 132 includes a sleeve nut 134 and a tubular threaded member 136. Nut 134 is threaded on member 136 so that the effective length of adjuster assembly 132 may be adjusted. The nut outer end 138 fits over the generally round extension 88 of the lower end 90 of shoe 50 and abuts a portion of the shoe web as illustrated in FIG. 1. The inner end of sleeve nut 134 has a toothed wheel 140 formed thereon. This wheel is commonly referred to as a star wheel. It may be suitably engaged by a brake adjusting linkage (not shown) of any suitable type of automatic brake adjustment. It is also accessible to be turned with a manual brake adjusting tool, as is well known. The outer end 142 of tubular threaded member 136 is slotted so as to receive parts of the shoe web inner portions after fitting over the generally round extension 88 forming the bottom end of brake shoe 54. Thus threaded member 136 is prevented from rotation during brake adjustment.

A spreader bar 144 is engaged in notches in the shoe webs and arranged to be actuated by suitable linkage 146 to mechanically apply the brake as a parking brake. When the parking brake is actuated, the effective length of the spreader bar is increased by moving sections thereof in opposite directions so that the brake shoe assemblies are moved in a brake apply direction.

The wheel cylinder assembly 44 is more completely disclosed in application Ser. No. 539,272 noted above. The wheel cylinder body 148 has a cylinder 150 formed therethrough. Opposed pistons 152 and 154 are sealingly and reciprocably received in cylinder 150 and have sockets formed in their outer ends which receive the spherical ends 72 of each of the shoes 50 and 54. The pressure chamber 154 formed by the pistons and the cylinder is arranged to receive brake actuating fluid, as is well known in the art. The cylinder body ends are provided with notches 158 and 160 so that notches 158 receive the side edge 36 of arm-like extension 40 and notches 160 receive the side edge 38 of extension 42.

In order to assemble the brake, the upper ends of the brake shoe assemblies are positioned so that they engage the wheel cylinder pistons. The shoe assemblies and the wheel cylinder assembly are then moved downwardly over the backing plate 12 so that the wheel cylinder assembly is located in notch 32 and channels 102 and 104 of the brake shoe assemblies 46 and 48 fit over the backing plate. The upper retractor spring 124 is installed with spreader bar 144 in position. The adjuster assembly 132 is positioned between the shoe assembly lower ends as shown and the lower retraction spring 130 is installed. The assembly is then complete. It will be retained in its assembled position by the retraction springs before the assembly is attached to the vehicle so that it may be handled as a unit.

During brake operation, the brake shoe assemblies, the adjuster assembly and the wheel cylinder assembly are permitted to move appropriately as needed in the plane of the backing plate so that their positions adjust during brake actuation and release as well as for brake adjustment. It can be seen that the shoes are not enclosed within the brake drum by the backing plate, but are instead much more open than the typical passenger car drum brake currently in use, contributing to improved brake cooling. As is illustrated in application Ser. No. 539,107 noted above, the lower portion of the backing plate 12 may be completely cut away, giving even more access to cooling air during braking.

If it is desired to provide a fixed anchor arrangement, lower backing plate extensions may be provided which are symmetrically identical to the upper extensions 40 and 42, extending in the same manner through the lower ends of the brake shoes. This will provide leading/trailing brakes instead of duo-servo brakes. The adjuster assembly 132 is installed in the same manner as wheel cylinder assembly 144 to provide adjustment. If it is desired to use twin cylinder actuation, a second wheel cylinder assembly is used instead of the adjuster assembly 132, with the lower backing plate extensions discussed above.

This arrangement has an advantage in economy of manufacture in that, in comparison to the typical passenger car duo-servo drum brake in current production usage, it eliminates the shoe anchor; the anchor and wheel cylinder fasteners; shoe hold-down springs, nails and cups; and several parts of the wheel cylinder assembly as more fully disclosed in application Ser. No. 539,272 noted above.

The embodiments of the invention in which an exclusive property or privilege is claimed are defined as follows:

1. In a drum brake assembly having a backing plate, an opposed-piston wheel cylinder located in the plane of the backing plate, an adjuster mechanism located in the plane of said backing plate, said wheel cylinder and said adjuster mechanism being on a backing plate first diameter and diametrically opposite each other, a pair of brake shoe assemblies located in the plane of and on said backing plate and on a backing plate second diameter and diametrically opposite each other, the backing plate first and second diameters being perpendicular to each other, said brake shoe assemblies having adjacent first ends normally engaging the pistons of the wheel cylinder and having adjacent second ends normally engaging opposite ends of the adjuster mechanism, brake lining segments on the brake shoe assemblies adapted to engage a brake drum in friction braking relation when the wheel cylinder is energized, and spring means holding said shoe assemblies in operating position on said backing plate and relative to said wheel cylinder and said adjuster mechanism;

the improvement comprising;

said brake shoe assemblies being identical and substantially symmetrically formed about said second diameter, each of said brake shoe assemblies being formed of two identical sections each having a web portion and a rim portion, said sections having means securing said identical sections together, a pair of oblong openings in said backing plate having their extended major axes forming acute angles with and intersecting said first diameter and intersecting each other radially outward of said wheel cylinder, a first pair and a second pair of other openings in said web portions, said first pair of other openings being respectively aligned with said pair of oblong openings in overlying relation, one of said spring means having opposed end hooks extending through said second pair of other openings and located adjacent said adjuster mechanism and another of said spring means having opposed end hooks extending through said first pair of other openings and said pair of oblong openings, said oblong openings acting as cam guides for said another spring means opposed end hooks and giving a return registry for said brake shoe assemblies.

* * * * *